(12) United States Patent
Watanabe et al.

(10) Patent No.: US 12,152,798 B2
(45) Date of Patent: Nov. 26, 2024

(54) AIR-CONDITIONING APPARATUS

(71) Applicant: Mitsubishi Electric Corporation, Tokyo (JP)

(72) Inventors: Kazuki Watanabe, Tokyo (JP); Masahiko Takagi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 302 days.

(21) Appl. No.: 17/790,334

(22) PCT Filed: Feb. 10, 2021

(86) PCT No.: PCT/JP2021/004865
§ 371 (c)(1),
(2) Date: Jun. 30, 2022

(87) PCT Pub. No.: WO2021/176975
PCT Pub. Date: Sep. 10, 2021

(65) Prior Publication Data
US 2023/0039252 A1 Feb. 9, 2023

(30) Foreign Application Priority Data

Mar. 5, 2020 (WO) .................. PCT/JP2020/009379

(51) Int. Cl.
*F24F 11/77* (2018.01)
*F24F 11/61* (2018.01)
(Continued)

(52) U.S. Cl.
CPC .............. *F24F 11/77* (2018.01); *F24F 11/61* (2018.01); *F24F 11/62* (2018.01); *F24F 11/74* (2018.01); *F24F 11/81* (2018.01); *F24F 2110/10* (2018.01)

(58) Field of Classification Search
CPC ........ F24F 1/0014; F24F 1/0059; F24F 11/02; F24F 11/04; F24F 11/54; F24F 11/62; F24F 11/74; F24F 11/81
See application file for complete search history.

(56) References Cited

U.S. PATENT DOCUMENTS

2020/0378637 A1   12/2020   Xi et al.

FOREIGN PATENT DOCUMENTS

| CN | 104596034 A | * | 5/2015 | ............ F24F 11/006 |
| CN | 111630326 A | * | 9/2020 | ............... F24F 11/54 |

(Continued)

OTHER PUBLICATIONS

JP-2006189183-A English Translation (Year: 2006).*

(Continued)

*Primary Examiner* — Crystal J Barnes-Bullock
(74) *Attorney, Agent, or Firm* — Posz Law Group, PLC

(57) ABSTRACT

An air-conditioning apparatus having a refrigerant circuit, in which a compressor, an outdoor heat exchanger, an expansion device, and an indoor heat exchanger are connected by a pipe and refrigerant circulates in the pipe, includes an indoor fan configured to supply an indoor air to the indoor heat exchanger, and a controller configured to control the compressor and the indoor fan. The controller is configured to run the compressor at a start of a cooling operation, start running the indoor fan at less than a set minimum wind velocity after a first set time has elapsed since the compressor started operating, run the indoor fan at the set minimum wind velocity after a second set time has elapsed since the indoor fan started operating at less than the set minimum wind velocity, and run the indoor fan at a set wind velocity after a third set time has elapsed since the indoor fan started operating at the set minimum wind velocity.

4 Claims, 7 Drawing Sheets

(51) Int. Cl.
  *F24F 11/62* (2018.01)
  *F24F 11/74* (2018.01)
  *F24F 11/81* (2018.01)
  *F24F 110/10* (2018.01)

(56) References Cited

FOREIGN PATENT DOCUMENTS

| | | | |
|---|---|---|---|
| JP | 2000213795 A * | 8/2000 | |
| JP | 2004101116 A * | 4/2004 | |
| JP | 2006-189183 A | 7/2006 | |
| JP | 2007032855 A * | 2/2007 | |
| JP | 2007-139228 A | 6/2007 | |
| JP | 2007-139374 A | 6/2007 | |
| JP | 2007-225154 A | 9/2007 | |
| JP | 4618113 B2 * | 1/2011 | |
| JP | 2012-122673 A | 6/2012 | |
| JP | 2015-230109 A | 12/2015 | |
| JP | 2016109356 A * | 6/2016 | ............ F24F 1/0014 |
| JP | 6824779 B2 * | 2/2021 | ............ F24F 1/0059 |
| JP | 7113775 B2 * | 8/2022 | ............ F24F 1/0059 |
| WO | 2017/179192 A1 | 10/2017 | |
| WO | 2019/104789 A1 | 6/2019 | |

OTHER PUBLICATIONS

JP-2007139374-A English Translation (Year: 2007).*
Office Action dated Apr. 4, 2024 issued in corresponding CN patent application No. 202180016915.X (and Machine Translation).
Office Action dated Oct. 31, 2023 issued in corresponding CN patent application No. 202180016915.X (and English translation).
International Search Report of the International Searching Authority mailed Mar. 30, 2021 for the corresponding International application No. PCT/JP2021/004865 (and English translation).
Office Action dated May 7, 2023 issued in corresponding Chinese Patent Application No. 202180016915.X (and English machine translation).
Office Action dated Jun. 20, 2023 issued in corresponding Japanese Patent Application No. 2022-505077 (and English machine translation).
Examination Report dated Nov. 14, 2022 issued in corresponding IN Patent Application No. 202227048432 (and English translation).

* cited by examiner

FIG. 12

| SUCTION TEMPERATURE [° C] | HUMIDITY [%RH] | DEW-POINT TEMPERATURE [° C] | SUCTION TEMPERATURE -16 [° C] |
|---|---|---|---|
| 19 | 40 | 5.1 | 3 |
| 30 | 40 | 14.9 | 14 |

AIR-CONDITIONING APPARATUS

CROSS REFERENCE TO RELATED APPLICATION

This application is a U.S. national stage application of International Patent Application No. PCT/JP2021/004865 filed on Feb. 10, 2021, which claims priority to International Patent Application No. PCT/JP2020/009379, filed on Mar. 5, 2020, the disclosures of which are incorporated herein by reference.

TECHNICAL FIELD

The present disclosure relates to an air-conditioning apparatus that performs air-conditioning in a room.

BACKGROUND

Hitherto, in an indoor unit of an air-conditioning apparatus, an unusual odor may be generated when an operation is started. Such an unusual odor is often caused by mold or dust attached to an indoor heat exchanger. It is known that such an unusual odor is generated especially when the indoor heat exchanger is getting wet and when the indoor heat exchanger is getting dry. Because an unusual odor generated in the indoor unit at the time of starting operation is caused when the indoor heat exchanger is getting wet, various techniques have been proposed recently for suppressing generation of an unusual odor when the indoor heat exchanger is getting wet.

For example, in Patent Literature 1, an air-conditioning apparatus is proposed that activates a compressor after a certain time period has elapsed after the start of a cooling operation, stops the rotation of an indoor fan during a time period when an indoor heat exchanger is getting wet, and drives the indoor fan continuously after driving the indoor fan intermittently after the indoor heat exchanger gets wet. In the air-conditioning apparatus described in Patent Literature 1, control is performed in which the indoor fan is stopped for a first time period after the start of a cooling operation and then an intermittent operation of the indoor fan is repeated. As a result, the air-conditioning apparatus drives the indoor fan after the indoor heat exchanger gets wet in some degree, and thus generation of an odor due to mold or dust attached to the indoor heat exchanger is suppressed.

PATENT LITERATURE

Patent Literature 1: Japanese Unexamined Patent Application Publication No. 2007-139228

However, in the air-conditioning apparatus described in Patent Literature 1, because the rotation speed of a fan for an initial activation is not specified, the indoor fan is usually rotated at the wind velocity set by a user. For example, when the indoor fan is rotated while the wind velocity is set to be high, the indoor heat exchanger in a cold and wet state may be dried rapidly by a sucked warm indoor air. Consequently, when the indoor heat exchanger in the indoor unit of the air-conditioning apparatus is dried, an unusual odor may be generated.

SUMMARY

The present disclosure has been made to overcome the problem in the abovementioned related-art technique, and an object thereof is to provide an air-conditioning apparatus capable of suppressing generation of an unusual odor in an indoor unit at the start of a cooling operation.

An air-conditioning apparatus according to an embodiment of the present disclosure has a refrigerant circuit in which a compressor, an outdoor heat exchanger, an expansion device, and an indoor heat exchanger are connected by a pipe and refrigerant circulates in the pipe, and includes an indoor fan configured to supply an indoor air to the indoor heat exchanger, and a controller configured to control the compressor and the indoor fan. The controller is configured to run the compressor at a start of a cooling operation, start running the indoor fan at less than a set minimum wind velocity after a first set time has elapsed since the compressor started operating, run the indoor fan at the set minimum wind velocity after a second set time has elapsed since the indoor fan started operating at less than the set minimum wind velocity, and run the indoor fan at a set wind velocity after a third set time has elapsed since the indoor fan started operating at the set minimum wind velocity.

According to an embodiment of the present disclosure, by gradually increasing the wind velocity of the indoor fan after the first set time has elapsed since the compressor started operating at the start of cooling operation, the indoor fan is driven while the temperature of the indoor heat exchanger is kept at a low temperature and dew is formed on the indoor heat exchanger. As a result, generation of an unusual odor can be suppressed in the indoor heat exchanger at the start of the cooling operation.

BRIEF DESCRIPTION OF DRAWINGS

FIG. 12 is a schematic view illustrating a relationship between a dew-point temperature and a fictive dew-point temperature in Embodiment 2.

DETAILED DESCRIPTION

Figure 1:
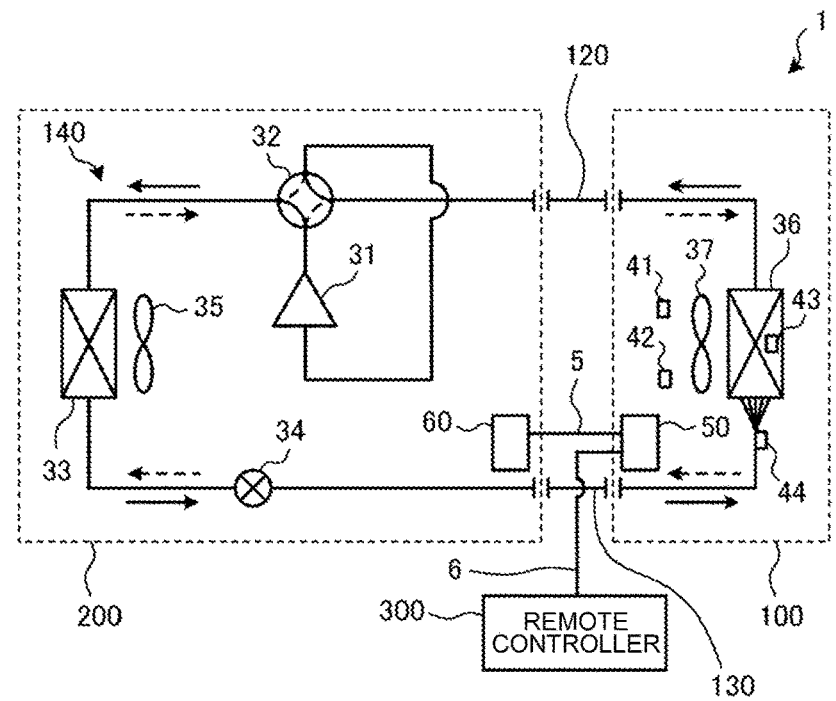
FIG. 1 is a circuit diagram illustrating an example of the configuration of an air-conditioning apparatus according to Embodiment 1.

Embodiments according to the present disclosure will be described below with reference to the drawings. The present disclosure is not limited by the embodiments described below, and various modifications can be made without departing from the spirit of the present disclosure. Further, the present disclosure includes every possible combination of the components shown in the embodiments below. In the drawings, components denoted by the same reference signs are the same or corresponding components, and this applies to the entire description. Furthermore, although terms indicating directions (such as "top", "bottom", "right", "left", "front", and "rear") are used, as appropriate, to facilitate understanding, these terms are used only for the explanation purpose and do not limit the arrangement and direction of a device or a component. In addition, in terms of pressures and temperatures, the states of "high" and "low" are not determined by comparing with any specific absolute values, but are relatively determined based on a condition and an operation in a system or a device. Note that, in the drawings used in the following description, a relative size relationship among components may differ from the actual relationship and the shape of each component may differ from the actual shape.

Embodiment 1

An air-conditioning apparatus according to Embodiment 1 will be described. The air-conditioning apparatus according to Embodiment 1 is configured to perform air-conditioning by heating or cooling an air-conditioning target space by causing refrigerant to circulate in a refrigerant circuit and transferring heat between an outdoor air and an indoor air via the refrigerant.

[Configuration of Air-Conditioning Apparatus 1]

FIG. 1 is a circuit diagram illustrating an example of the configuration of an air-conditioning apparatus according to Embodiment 1. As shown in FIG. 1, an air-conditioning apparatus 1 includes an outdoor unit 200, an indoor unit 100, and a remote controller 300. The outdoor unit 200 and the indoor unit 100 are connected to each other by a refrigerant pipe 120 and a refrigerant pipe 130. By connecting the outdoor unit 200 and the indoor unit 100 in this way, a refrigerant circuit 140 through which refrigerant circulates is formed. In the refrigerant circuit 140 of the air-conditioning apparatus 1, a compressor 31, a flow switching device 32, an outdoor heat exchanger 33, an expansion valve 34, and an indoor heat exchanger 36 are connected via refrigerant pipes.

(Outdoor Unit 200)

The outdoor unit 200 includes the compressor 31, the flow switching device 32, the outdoor heat exchanger 33, an outdoor fan 35, and the expansion valve 34. The outdoor unit 200 further includes an outdoor control device 60 that controls the compressor 31, the flow switching device 32, and the outdoor fan 35.

The compressor 31 is configured to compress and discharge sucked refrigerant. The compressor 31 may include an inverter device, and may be configured so that the capacity of the compressor 31 can be changed by changing an operation frequency by the inverter device. Note that the capacity of the compressor 31 is the amount of refrigerant delivered per unit time.

The flow switching device 32 is, for example, a four-way valve and is configured to switch directions of a refrigerant passage. By switching refrigerant flows by the flow switching device 32 based on an instruction from the outdoor control device 60, the air-conditioning apparatus 1 can achieve a heating operation or a cooling operation.

The outdoor heat exchanger 33 is configured to cause heat exchange to be performed between the refrigerant and an outdoor air. The outdoor heat exchanger 33 functions as an evaporator in heating operation to evaporate and gasify the refrigerant by causing heat exchange to be performed between the refrigerant in a low-pressure state flowing from the refrigerant pipe 130 and an outdoor air. The outdoor heat exchanger 33 functions as a condenser in a cooling operation to condense and liquefy the refrigerant by causing heat exchange to be performed between the refrigerant, which has been compressed by the compressor 31 and entered from the side of the flow switching device 32, and an outdoor air.

The outdoor fan 35 is provided to improve the efficiency of heat exchange between the refrigerant and an outdoor air in the outdoor heat exchanger 33. The outdoor fan 35 is controlled to be driven or stopped based on an instruction of the outdoor control device 60. In the outdoor fan 35, the rotation rate of a fan may be changed by changing the operation frequency of the fan motor based on an instruction of the outdoor control device 60. In the outdoor fan 35, when the rotation rate of the fan is controlled by the outdoor control device 60, the velocity of wind to be supplied to the outdoor heat exchanger 33 is controlled.

The expansion valve 34 is an expansion device (flow control unit) that functions as an expansion valve by adjusting the flow rate of the refrigerant flowing through the expansion valve 34. The pressure of the refrigerant is adjusted by changing the opening degree of the expansion valve 34. For example, when the expansion valve 34 is an electronic expansion valve or a similar device, the opening degree thereof is adjusted based on an instruction of the outdoor control device 60.

The outdoor control device 60 is housed in an electric component box, for example. The outdoor control device 60 is configured to control devices provided in the outdoor unit 200. In the air-conditioning apparatus 1 according to Embodiment 1, the outdoor control device 60 is configured to control the compressor 31, the flow switching device 32, the outdoor fan 35, and the expansion valve 34 based on instructions from an indoor control device 50, which is connected to the outdoor control device 60 via a cable 5. The indoor control device 50 will be described later. The outdoor control device 60 is an arithmetic unit, such as a microcomputer that executes software to achieve various functions, or hardware, such as circuit devices corresponding to respective functions.

(Indoor Unit 100)

The indoor unit 100 includes the indoor heat exchanger 36 and an indoor fan 37. The indoor unit 100 also includes the indoor control device 50 that controls the indoor fan 37.

The indoor heat exchanger 36 is configured to cause heat exchange to be performed between the refrigerant and an indoor air, which is air in an air-conditioning target space. The indoor heat exchanger 36 functions as a condenser in a heating operation to condense and liquefy the refrigerant by causing heat exchange to be performed between the refrigerant flowing from the refrigerant pipe 120 and the indoor air. The indoor heat exchanger 36 functions as an evaporator in cooling operation. The indoor heat exchanger 36 is configured to cause heat exchange to be performed between the refrigerant whose pressure is reduced by the expansion valve 34 and the indoor air to cause the refrigerant to draw heat away from the air, thereby evaporating and gasifying the refrigerant.

The indoor fan 37 is configured to control a flow of air to be used in heat exchange at the indoor heat exchanger 36 and supply the indoor air to the indoor heat exchanger 36. The indoor fan 37 is controlled to be driven or stopped based on an instruction of the indoor control device 50. In the indoor fan 37, the rotation rate of a fan may be changed by changing the operation frequency of the fan motor based on an instruction of the indoor control device 50. In the indoor fan 37, when the rotation rate of the fan is controlled by the indoor control device 50, the velocity of wind to be supplied to the indoor heat exchanger 36 is controlled.

Furthermore, the indoor unit 100 is provided with a suction temperature sensor 41, a humidity sensor 42, a two-phase pipe temperature sensor 43, and a liquid pipe temperature sensor 44. The suction temperature sensor 41 is configured to detect the temperature of air in the indoor space, which is the air-conditioning target space. The humidity sensor 42 is configured to detect the humidity in the indoor space, which is the air-conditioning target space. That is, the suction temperature sensor 41 and the humidity sensor 42 detect the temperature and the humidity of air passing through an air inlet 14a (see FIGS. 5 and 6) of the indoor unit 100. The temperature and the humidity of the air detected by the suction temperature sensor 41 and the humidity sensor 42 are output to the indoor control device 50.

The two-phase pipe temperature sensor 43 is installed at the indoor heat exchanger 36 to detect the temperature of the indoor heat exchanger 36. The temperature of the indoor heat exchanger 36 detected by the two-phase pipe temperature sensor 43 is output to the indoor control device 50. The liquid pipe temperature sensor 44 is installed at the indoor heat exchanger 36 to detect the temperature of a heat transfer tube in which the refrigerant in a liquid state flowing into and out from the indoor heat exchanger 36 flows. For example, the indoor heat exchanger 36 may have such a configuration that the heat transfer tube has a plurality of paths, the refrigerant having flowed in the indoor heat exchanger 36 is divided to the plurality of paths, heat exchange is performed in in each path, flows of the divided refrigerant are merged together after heat exchange, and the merged refrigerant is discharged from the indoor heat exchanger 36. In this case, the liquid pipe temperature sensor 44 detects the temperature of the refrigerant before being divided or after being merged. That is, because the refrigerant having passed the installation positon of the liquid pipe temperature sensor 44 is divided to each path through a branch pipe, the temperature of the heat transfer tube detected by the liquid pipe temperature sensor 44 can be used as an index of the temperature of the refrigerant immediately before the division. The temperature of the heat transfer tube detected by the liquid pipe temperature sensor 44 is output to the indoor control device 50.

(Indoor Control Device 50)

The indoor control device 50 is housed, as an indoor control board, in an electric component box 40 (see FIGS. 6 and 7), which will be described later. The indoor control device 50 is configured to control the devices provided in the indoor unit 100 and also control the devices provided in the outdoor unit 200 via the outdoor control device 60, which is connected thereto by the cable 5. That is, the indoor control device 50 is configured to control the entire air-conditioning apparatus 1. In Embodiment 1, the indoor control device 50 performs odor suppression processing, which will be described later, while controlling the rotation rate of the indoor fan 37 based on detection results of the suction temperature sensor 41, the humidity sensor 42, and the two-phase pipe temperature sensor 43. Note that details of the indoor control device 50 will be described later.

Figure 2:
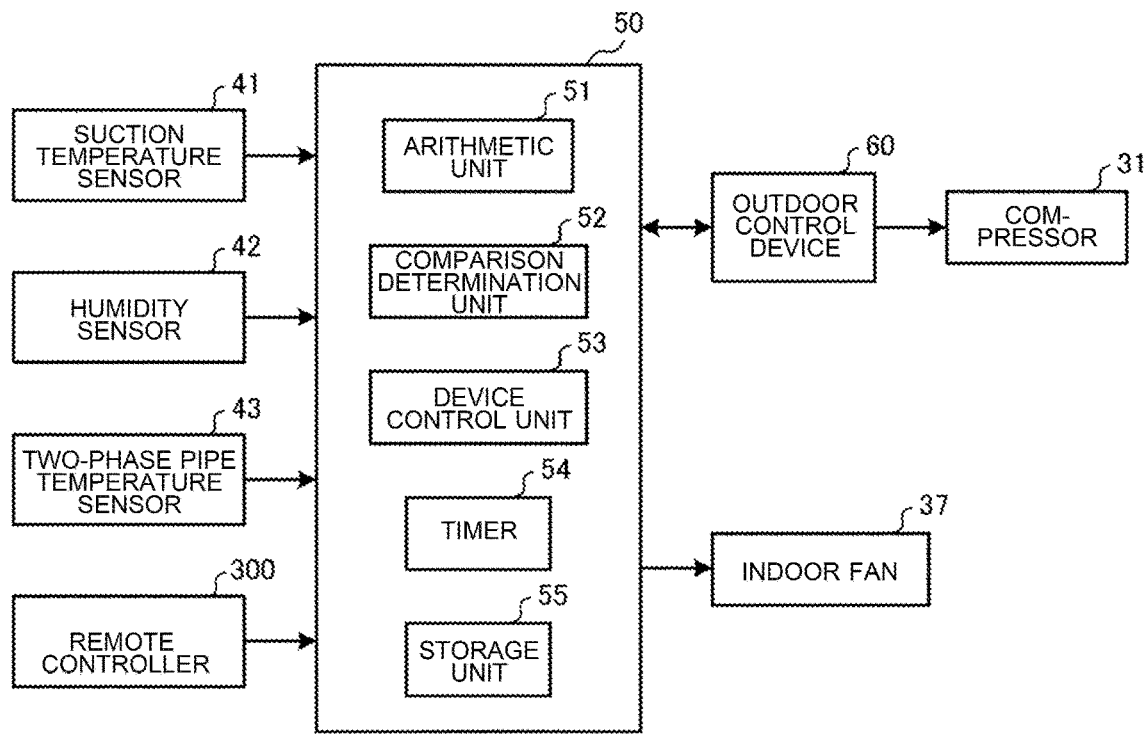
FIG. 2 is a functional block diagram illustrating an example of the configuration of an indoor control device of FIG. 1.

FIG. 2 is a functional block diagram illustrating an example of the configuration of the indoor control device of FIG. 1. As shown in FIG. 2, the indoor control device 50 includes an arithmetic unit 51, a comparison determination unit 52, a device control unit 53, a timer 54, and a storage unit 55. The indoor control device 50 is an arithmetic unit, such as a microcomputer that executes software to achieve various functions, or hardware, such as circuit devices corresponding to respective functions.

The arithmetic unit 51 is configured to derive a dew-point temperature based on an indoor temperature detected by the suction temperature sensor 41 and an indoor humidity detected by the humidity sensor 42. The storage unit 55 stores various types of information to be used in the units of the indoor control device 50. In Embodiment 1, the storage unit 55 stores in advance a first set time T1 to a fifth set time T5 to be used in the comparison determination unit 52.

The first set time T1 is a time period from the start of operation of the compressor 31 to the start of operation of the indoor fan 37. The first set time T1 is set to 30 seconds, for example. The second set time T2 is a time period during which the indoor fan 37 runs at less than a set minimum wind velocity (very quiet wind). The second set time T2 is set to 60 seconds, for example. The third set time T3 is a time period during which the indoor fan 37 runs at the set minimum wind velocity (quiet wind). The third set time T3 may be set to the same time period as that of the second set time T2, or may be set to a different time period, such as a longer or shorter time period than that of the second set time T2.

The fourth set time T4 is a time period during which the temperature of the indoor heat exchanger 36 is continuously below the dew-point temperature and the indoor fan 37 runs at less than the set minimum wind velocity (very quiet wind). The fourth set time T4 is set to a time period shorter than that of the second set time T2 and shorter than that of the third set time T3. The fourth set time T4 is set to 30 seconds, for example. The fifth set time T5 is a time period during which the temperature of the indoor heat exchanger 36 is continuously below the dew-point temperature and the indoor fan 37 runs at the set minimum wind velocity (quiet wind). The fifth set time T5 may be set to the same time period as that of the fourth set time T4, or may be set to a different time period, such as a longer or shorter time period than that of the fourth set time T4. Note that the set minimum wind velocity represents the lowest wind velocity that a user can set within an operable range of the indoor fan 37.

The comparison determination unit 52 is configured to compare various information and make determinations based on the comparison results when performing the odor suppression processing, which will be described later. More specifically, the comparison determination unit 52 compares the indoor set temperature supplied from the remote controller 300 and a suction temperature, which is the indoor temperature, detected by the suction temperature sensor 41 to determine which temperature is higher. In addition, the comparison determination unit 52 compares the temperature of the indoor heat exchanger 36 detected by the two-phase pipe temperature sensor 43 and a dew-point temperature calculated by the arithmetic unit 51 to determine which temperature is higher.

The device control unit 53 is configured to control the rotation rate of the indoor fan 37 to change the wind velocity of air to be supplied to the indoor heat exchanger 36 from the indoor fan 37 based on a determination result of the comparison determination unit 52. The timer 54 is configured to measure time from a predetermined time. Specifically, the timer 54 measures an operation time of the compressor 31, and an operation time of the indoor fan 37 since the rotation rate was controlled.

Figure 3:
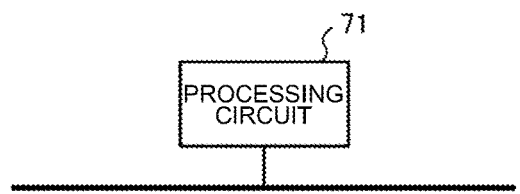
FIG. 3 is a hardware configuration diagram illustrating an example of the configuration of the indoor control device of FIG. 2.

FIG. 3 is a hardware configuration diagram illustrating an example of the configuration of the indoor control device of FIG. 2. When various functions of the indoor control device 50 are executed by hardware, the indoor control device 50 of FIG. 2 is formed as a processing circuit 71, as shown in FIG. 3. In the indoor control device 50 of FIG. 2, functions of the arithmetic unit 51, the comparison determination unit 52, the device control unit 53, the timer 54, and the storage unit 55 are achieved by the processing circuit 71.

When the functions are implemented by hardware, the processing circuit 71 corresponds to, for example, a single circuit, a composite circuit, a programmed processor, a parallel-programmed processor, an application specific integrated circuit (ASIC), a field-programmable gate array (FPGA), or a combination of these circuits. The indoor control device 50 may achieve the functions of the arithmetic unit 51, comparison determination unit 52, the device control unit 53, the timer 54 and the storage unit 55 by respective processing circuits 71 or by a single processing circuit 71.

Figure 4:
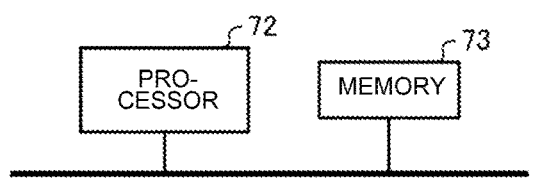
FIG. 4 is a hardware configuration diagram illustrating another example of the configuration of the indoor control device of FIG. 2.

FIG. 4 is a hardware configuration diagram illustrating another example of the configuration of the indoor control device of FIG. 2. When various functions of the indoor control device 50 are executed by software, the indoor control device 50 of FIG. 2 is formed as a processor 72 and a memory 73, as shown in FIG. 4. In the indoor control device 50, functions of the arithmetic unit 51, the comparison determination unit 52, the device control unit 53, the timer 54, and the storage unit 55 are achieved by the processor 72 and the memory 73.

When the functions are implemented by software, the functions of the arithmetic unit 51, the comparison determination unit 52, the device control unit 53, the timer 54, and the storage unit 55 are achieved by software, firmware, or a combination of software and firmware in the indoor control device 50. The software and the firmware are described as programs and stored in the memory 73. The processor 72 is configured to read out and execute the programs stored in the memory 73 to thereby implement the functions.

The memory 73 is, for example, a random access memory (RAM), a read only memory (ROM), a flash memory, an erasable and programmable ROM (EPROM), an electrically erasable and programmable ROM (EEPROM), or other types of non-volatile or volatile semiconductor memory. In addition, the memory 73 may be, for example, a magnetic disk, a flexible disk, an optical disc, a compact disc (CD), a mini disc (MD), a digital versatile disc (DVD), or other types of detachable recording medium.

(Remote Controller 300)

The air-conditioning apparatus 1 includes a remote controller (hereinafter referred to as "remote") 300. The remote 300 is used by a user to remotely control the air-conditioning apparatus 1.

The remote 300 is connected to the indoor control device 50 by a remote line 6. The remote 300 is configured to communicate with the indoor control device 50 via the remote line 6 by transmitting and receiving signals. For example, the remote 300 transmits a stop signal for stopping the operation of the air-conditioning apparatus 1 to the indoor control device 50. The operations of the indoor unit 100 and the outdoor unit 200 are thus stopped. In addition, the remote 300 transmits a start signal for starting the operation of the air-conditioning apparatus 1 to the indoor control device 50. The operations of the indoor unit 100 and the outdoor unit 200 are thus started.

Furthermore, the remote 300 can set an indoor set temperature, which is a desired indoor temperature, based on an operation of a user. The remote 300 transmits a signal indicating the indoor set temperature being set to the indoor control device 50. Note that, the connection between the remote 300 and the indoor control device 50 is not limited to the connection using the remote line 6. The remote 300 and the indoor control device 50 may be wirelessly connected, for example.

(Configuration of Indoor Unit 100)

Figure 5:
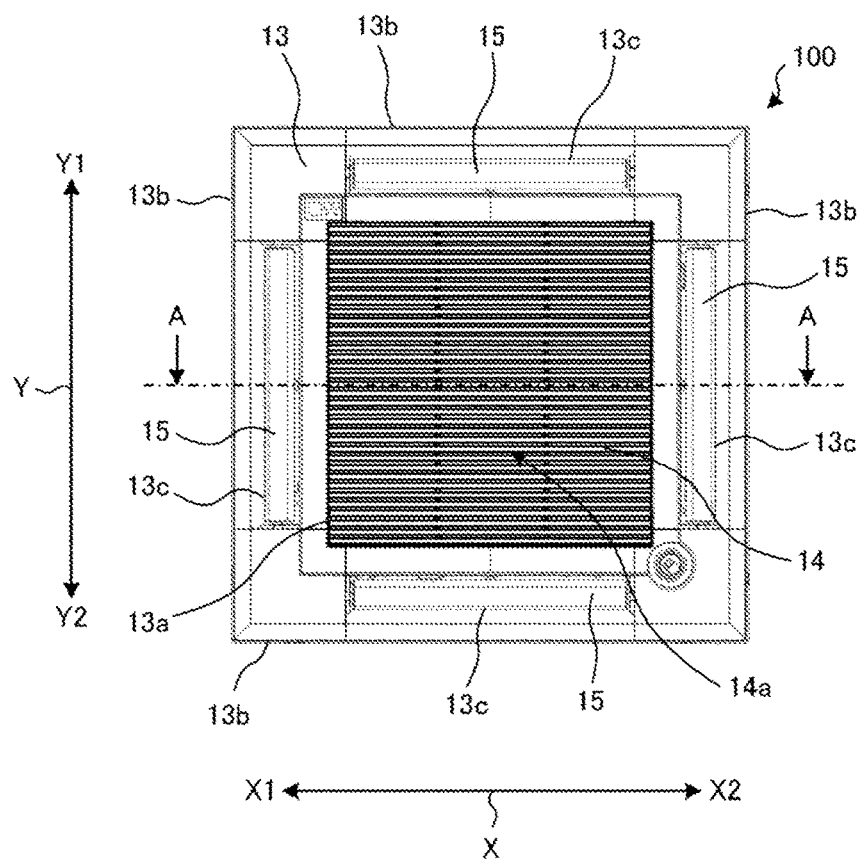
FIG. 5 is a bottom view illustrating an example of the appearance of an indoor unit of FIG. 1.
Figure 6:
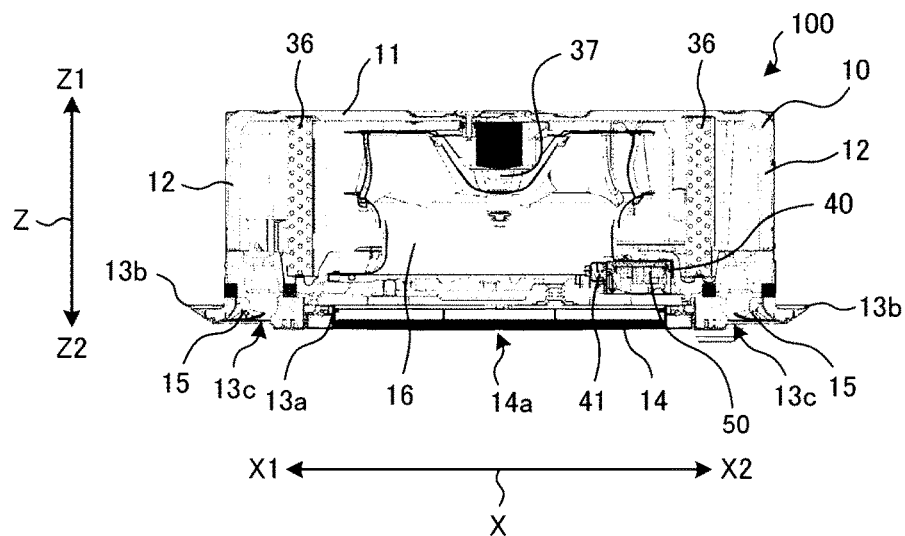
FIG. 6 is a schematic sectional view of the indoor unit taken along the line A-A of FIG. 5.

Next, the configuration of the indoor unit 100 will be described. FIG. 5 is a bottom view illustrating an example of the appearance of the indoor unit of FIG. 1. FIG. 6 is a schematic sectional view of the indoor unit taken along the line A-A of FIG. 5. An X-axis shown in FIG. 5 and the following drawings represents the right and left width direction of the indoor unit 100. A Y-axis represents the front and back direction of the indoor unit 100. A Z-axis represents the vertical direction of the indoor unit 100. More specifically, the indoor unit 100 will be described with an X1 side of the X-axis as the left side and an X2 side thereof as the right side, a Y1 side of the Y-axis as the front side and a Y2 side thereof as the back side, and a Z1 side of the Z-axis as the upper side and a Z2 side thereof as the lower side. Furthermore, the description basically represents a positional relationship (for example, a relationship in the vertical direction) among the components based on the assumption that the indoor unit 100 is placed in an actual use state.

The indoor unit 100 according to Embodiment 1 is, for example, an indoor unit of a ceiling embedded type that can be embedded in a ceiling, and of a four-way cassette type in which air outlets 13*c* are formed in four directions. As shown in FIG. 6, the indoor unit 100 has a casing 10 that houses the indoor fan 37 and the indoor heat exchanger 36. The casing 10 has a top panel 11 forming a ceiling face and four side plates 12 forming front, back, right, and left side-faces. The casing 10 has an opening on a lower side (Z2 side) facing the inside of a room. On the opening of the casing 10, a decorative panel 13 having a substantially rectangular shape in a plane view is attached, as shown in FIG. 5.

The decorative panel 13 is a plate-like component. One face of the decorative panel 13 faces an attached face, such as a ceiling or a wall, and the other face faces the inside of a room, which is an air-conditioning target space. As shown in FIGS. 5 and 6, an opening part 13*a* as a through hole is formed near the center of the decorative panel 13. A suction grill 14 is attached on the opening part 13*a*. On the suction grill 14, an air inlet 14*a* is formed through which air enters the casing 10 from the inside of the room corresponding to an air-conditioning target space. On the casing 10 side of the suction grill 14, a filter (not shown) for removing dust in the air having passed through the suction grill 14 is arranged. An air outlet 13*c* from which air flows out is formed on the decorative panel 13 between an outer edge part 13*b* of the decorative panel 13 and an inner edge part forming the opening part 13*a*. One air outlets 13*c* is formed along each of the four sides of the decorative panel 13. That is, in the casing 10, the indoor heat exchanger 36 and the indoor fan 37 are housed, and a plurality of air outlets 13*c* are formed from which air having passed through the indoor heat exchanger 36 is blown out by driving of the indoor fan 37. In the casing 10, an air passage is formed between the air inlet 14*a* and the air outlet 13*c*.

Each air outlet 13c is provided with a vane 15 that changes the direction of wind flow. The indoor unit 100 is capable of changing the direction of wind blown out from the air outlet 13c by changing the angle of the vane 15. The vane 15 is a wind direction plate that is connected to a motor (not shown) and whose angle can be changed by the indoor control device 50. By changing the angle of the vane 15, the indoor control device 50 can open and close the air outlet 13c.

Figure 7:
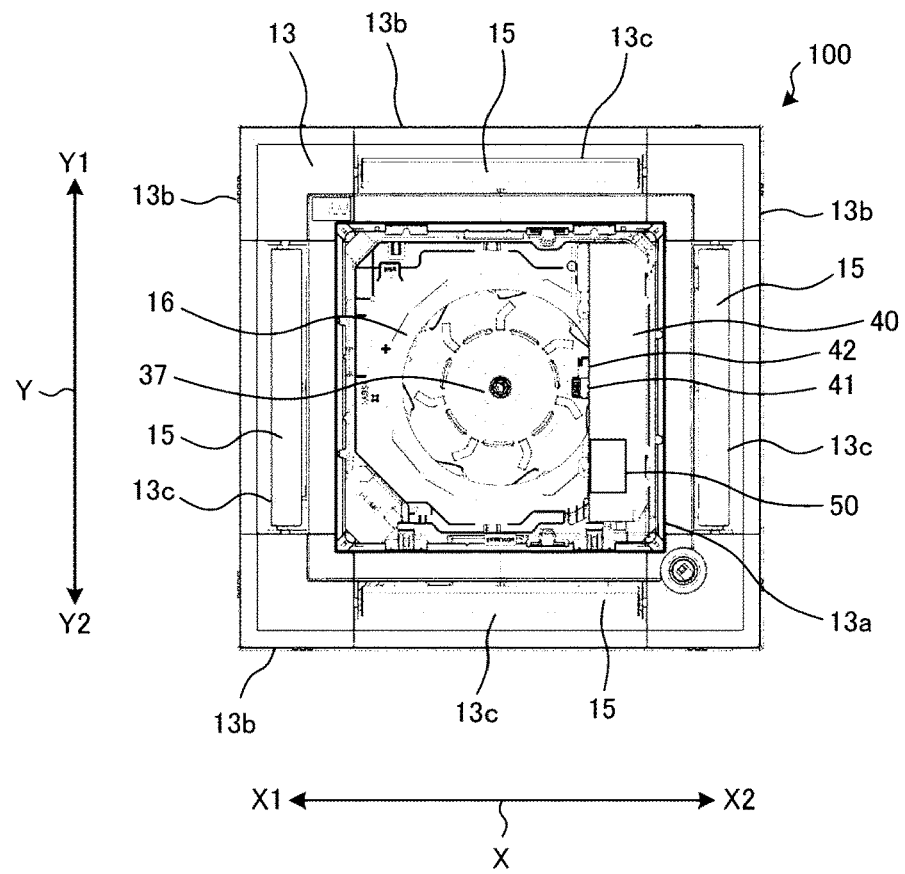
FIG. 7 is a bottom view illustrating the indoor unit of FIG. 5 without a suction grill.

FIG. 7 is a bottom view illustrating the indoor unit of FIG. 5 without the suction grill. The indoor fan 37 and the indoor heat exchanger 36 are provided inside the casing 10. The indoor fan 37 is configured to cause air in the room to enter the air inlet 14a of the indoor unit 100 and cause air to flow into the room from the air outlet 13c of the indoor unit 100. The indoor fan 37 is arranged to face the suction grill 14 in the casing 10. In addition, the indoor fan 37 is arranged in the casing 10 in such a manner that the rotation shaft is extended in the vertical direction (Z-axis direction).

In the casing 10, the indoor heat exchanger 36 is arranged in an air passage between the indoor fan 37 and the air outlet 13c. The indoor heat exchanger 36 is configured to cause heat exchange to be performed between the refrigerant flowing therein and air flowing in the air passage. By causing heat exchange to be performed between the refrigerant flowing therein and the indoor air, the indoor heat exchanger 36 produces air for air-conditioning. The indoor heat exchanger 36 is, for example, a fin-tube type heat exchanger, and is arranged to surround the indoor fan 37 on a downstream side of the indoor fan 37 in the air flow.

In the casing 10, the indoor fan 37 and the indoor heat exchanger 36 are arranged on a downstream side of the air inlet 14a in the air flow but on an upstream side of the air outlet 13c in the air flow. In addition, in the indoor unit 100, the indoor fan 37 is arranged above the suction grill 14 and the indoor heat exchanger 36 is arranged in a radial direction of the indoor fan 37. Furthermore, in the indoor unit 100, the suction grill 14 is arranged below the indoor heat exchanger 36.

The indoor unit 100 also has a bell mouth 16. As shown in FIGS. 6 and 7, the bell mouth 16 is installed on an upstream side of the indoor fan 37 on the air inflow side of the indoor unit 100. The bell mouth 16 is configured to straighten the flow of air entering from the air inlet 14a of the suction grill 14 and then supply the air to the indoor fan 37.

The indoor unit 100 is provided with the electric component box 40 between the bell mouth 16 and the suction grill 14 in the casing 10. The electric component box 40 houses a device such as the indoor control device 50. The device in the electric component box 40 supplies power to devices of the indoor unit 100 and performs transmission/reception (communication) of signals with various devices included in the air-conditioning apparatus 1. The electric component box 40 is formed in a substantially cuboid shape. The electric component box 40 is arranged in the opening part 13a formed on the decorative panel 13, in a plane view looking up at the ceiling from the inside of the room. The longitudinal direction of the electric component box 40 is arranged along an edge part of the decorative panel 13, the edge part forming one side of the opening part 13a. The electric component box 40 is fixed in the casing 10 by a fixing component, such as a screw, for example.

The indoor unit 100 also has the cable 5. The cable 5 is a communication line that is used in communication of signals including data between the indoor unit 100 and the outdoor unit 200. However, note that the connection between the indoor unit 100 and the outdoor unit 200 is not limited to a wired connection such as the one using the cable 5. The indoor unit 100 and the outdoor unit 200 may be connected via a wireless connection.

The suction temperature sensor 41 and the humidity sensor 42 are arranged between the air inlet 14a and the indoor fan 37. However, note that the installation positions of the suction temperature sensor 41 and the humidity sensor 42 are not limited to the position described above. The suction temperature sensor 41 and the humidity sensor 42 may be arranged at positions appropriate for detection of the indoor temperature and the indoor humidity, based on the structure of the indoor unit 100.

Figure 8:
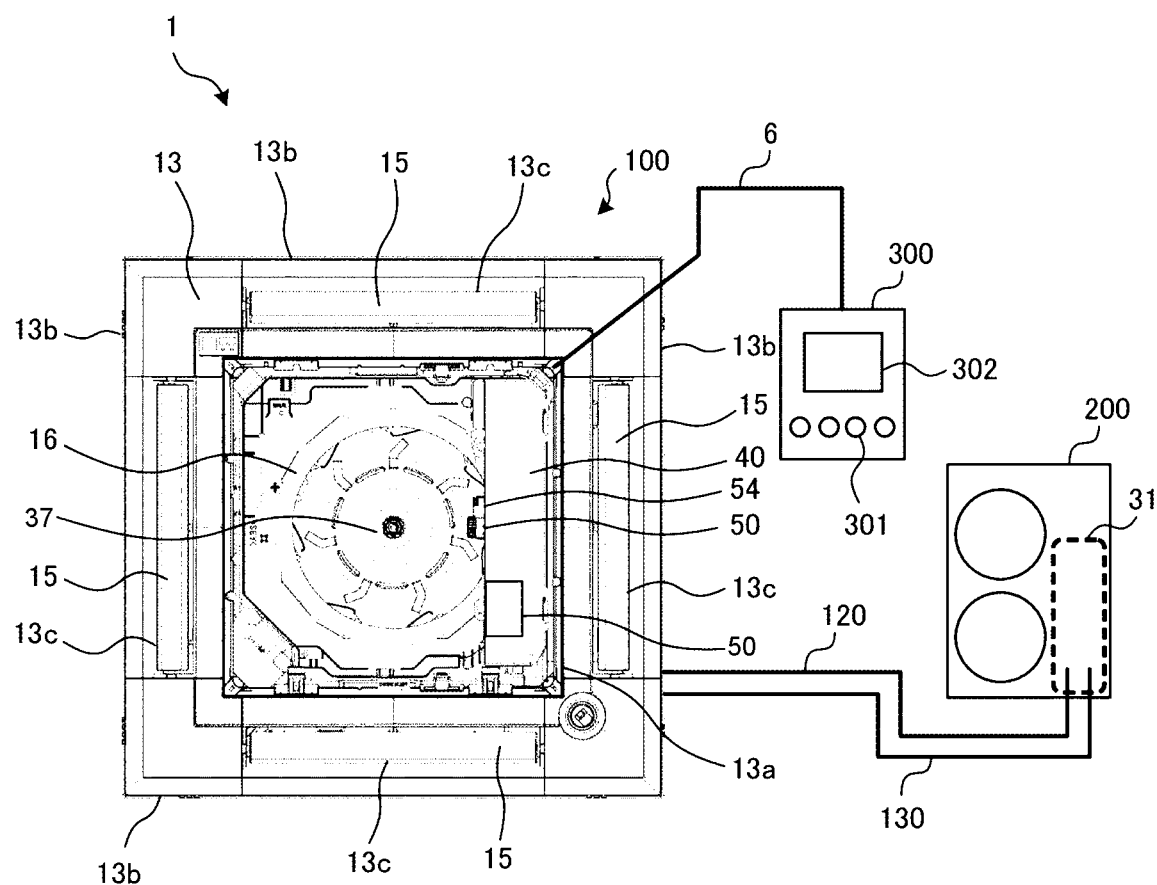
FIG. 8 is a schematic view illustrating an example of a connection relationship among units in the air-conditioning apparatus according to Embodiment 1.

FIG. 8 is a schematic view illustrating an example of a connection relationship among units in the air-conditioning apparatus according to Embodiment 1. As shown in FIG. 8, the indoor unit 100 is connected to the outdoor unit 200 via the refrigerant pipe 120 and the refrigerant pipe 130. The indoor unit 100 is also connected to the remote 300 via the remote line 6.

The remote 300 is provided with an operation unit 301 and a display unit 302. The operation unit 301 is an input device for inputting an instruction of a user into the indoor control device 50 of the air-conditioning apparatus 1. An input method for the operation unit 301 is not limited to any particular method. For example, the operation unit 301 may be a button, a contact-type sensor or a microphone for voice input.

The display unit 302 displays operation conditions of the air-conditioning apparatus 1 based on the indoor control device 50, such as an operation mode (cooling, heating, dehumidification, etc.), a set temperature, a detected room temperature, a set humidity, a detected humidity, and the current time. The display unit 302 is, for example, a liquid crystal display (LCD) or an organic electro luminescence (EL) display.

[Operation of Air-Conditioning Apparatus 1]

Next, with reference to FIG. 1, operation of the air-conditioning apparatus 1 having the abovementioned configuration will be described together with refrigerant flows. Here, the refrigerant flow for a case where the air-conditioning apparatus 1 performs a cooling operation and that for a case of a heating operation will be described. In FIG. 1, the solid line arrows represent the flow of the refrigerant in a cooling operation and the broken line arrows represent the flow of the refrigerant in a heating operation. Note that, the air-conditioning apparatus 1 is capable of performing an operation other than the cooling operation and the heating operation, such as, for example, a dehumidification operation or a ventilation operation.

(In Cooling Operation)

When the air-conditioning apparatus 1 performs a cooling operation, the flow switching device 32 is first switched to the state indicated by the solid lines in FIG. 1. That is, the flow switching device 32 is switched so that the discharge side of the compressor 31 and the outdoor heat exchanger 33 are connected to each other and the suction side of the compressor 31 and the indoor heat exchanger 36 are connected to each other.

When the compressor 31 is driven, the compressor 31 discharges the refrigerant in a high-temperature and high-pressure gas state. The refrigerant in a high-temperature and high-pressure gas state discharged from the compressor 31 flows into the outdoor heat exchanger 33 functioning as a condenser, via the flow switching device 32. The outdoor heat exchanger 33 exchanges heat between the refrigerant in a high-temperature and high-pressure gas state flowing therein and an outdoor air supplied by an indoor fan 35. The refrigerant in a high-temperature and high-pressure gas state is thus condensed and enters a high-pressure liquid state.

The refrigerant in a high-pressure liquid state that has flowed out from the outdoor heat exchanger 33 is expanded in the expansion valve 34 and thus enters a two-phase state in which the refrigerant in a low-pressure gas state and the refrigerant in a low-pressure liquid state are mixed. The refrigerant in a two-phase state flows into the indoor heat exchanger 36 functioning as an evaporator. The indoor heat exchanger 36 exchanges heat between the refrigerant in a two-phase state flowing therein and an indoor air supplied by the indoor fan 37. The refrigerant in a liquid state of the refrigerant in a two-phase state is thus evaporated and enters a low-pressure gas state.

The refrigerant in a low-pressure gas state that has flowed out from the indoor heat exchanger 36 flows into the compressor 31 via the flow switching device 32, is compressed therein, and thus enters a high-temperature and high-pressure gas state. Then, the refrigerant is discharged again from the compressor 31. By repeating this cycle, the refrigerant circulates through the refrigerant circuit 140 as shown by the solid line arrows in FIG. 1.

(In Heating Operation)

When the air-conditioning apparatus 1 performs a heating operation, the flow switching device 32 is first switched to the state indicated by the broken lines in FIG. 1. That is, the flow switching device 32 is switched so that the discharge side of the compressor 31 and the indoor heat exchanger 36 are connected to each other and the suction side of the compressor 31 and the outdoor heat exchanger 33 are connected to each other.

When the compressor 31 is driven, the compressor 31 discharges the refrigerant in a high-temperature and high-pressure gas state. The refrigerant in a high-temperature and high-pressure gas state discharged from the compressor 31 flows into the indoor heat exchanger 36 functioning as a condenser, via the flow switching device 32. The indoor heat exchanger 36 exchanges heat between the refrigerant in a high-temperature and high-pressure gas state flowing therein and the indoor air supplied by the indoor fan 37. The refrigerant in a high-temperature and high-pressure gas state is thus condensed and enters a high-pressure liquid state.

The refrigerant in a high-pressure liquid state that has flowed out from the indoor heat exchanger 36 is expanded in the expansion valve 34 and thus enters a two-phase state in which the refrigerant in a low-pressure gas state and the refrigerant in a low-pressure liquid state are mixed. The refrigerant in a two-phase state flows into the outdoor heat exchanger 33 functioning as an evaporator. The outdoor heat exchanger 33 causes heat exchange to be performed between the refrigerant in a two-phase state flowing therein and outdoor air supplied by the outdoor fan 35. The refrigerant in a liquid state of the refrigerant in a two-phase state is thus evaporated and enters a low-pressure gas state. The refrigerant in a low-pressure gas state that has flowed out from the outdoor heat exchanger 33 flows into the compressor 31 via the flow switching device 32, is compressed therein, and thus enters a high-temperature and high-pressure gas state. Then, the refrigerant is discharged again from the compressor 31. By repeating this cycle, the refrigerant circulates through the refrigerant circuit 140 as shown by the broken line arrows in FIG. 1.

[Odor Suppression Processing]

Next, odor suppression processing will be described. In the air-conditioning apparatus 1 according to Embodiment 1, odor suppression processing is performed to suppress generation of an unusual odor in the indoor unit 100. The odor suppression processing suppresses an unusual odor generated at the start of operation of the air-conditioning apparatus 1 by controlling the wind velocity of the indoor fan 37.

(Regarding Generation of Unusual Odor)

Before odor suppression processing is explained, a mechanism that generates an unusual odor in the indoor unit 100 will be described. In recent years, to achieve energy saving and improve efficiency, the capacities of indoor heat exchangers to be installed in indoor units are increased by making fin pitches smaller. Consequently, the surface area of such an indoor heat exchanger having a larger capacity is increased, and thus the amount of an oil of human skin or other oil that enters the indoor unit via the air inlet thereof and adheres to the surface area is increased. When the oil of human skin or other oil attached to the indoor heat exchanger is decomposed by microorganisms, a malodorous substance is generated in the indoor heat exchanger.

Furthermore, from a macro perspective, dust attached to an indoor heat exchanger or propagation of mold in the indoor heat exchanger causes generation of an unusual odor in the indoor heat exchanger. When a fan of an indoor unit is driven under such a condition, an unusual odor is blown out into an air-conditioning target space together with air blown out from the indoor unit. Consequently, a user can smell the unusual odor in the air supplied by the indoor unit. It is known that this unusual odor occurs when the indoor heat exchanger is getting wet and when the indoor heat exchanger is getting dry.

The odor suppression processing according to Embodiment 1 is performed to suppress generation of an unusual odor when the indoor heat exchanger 36 is getting wet after the air-conditioning apparatus 1 starts cooling operation. More specifically, in the odor suppression processing, to suppress generation of an unusual odor in the indoor unit 100 at the start of a cooling operation, the rotation rate of the indoor fan 37 is controlled in such a manner that the wind velocity is gradually increased.

(Control of Wind Velocity of Indoor Fan 37)

Figure 9:
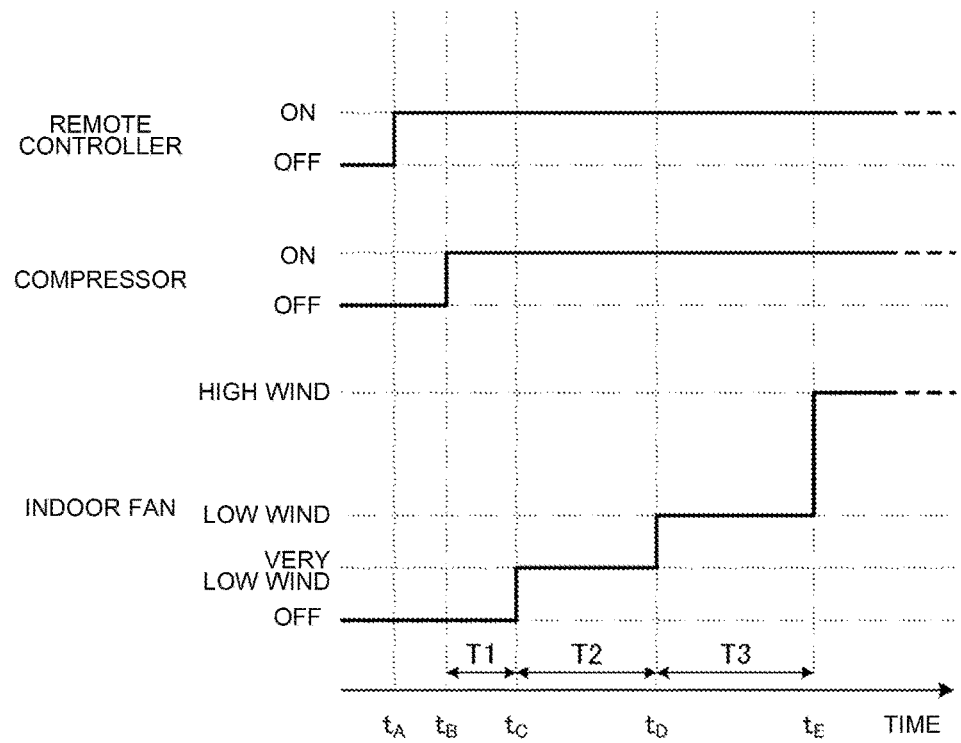
FIG. 9 is a schematic view illustrating a first operation example of an indoor fan in odor suppression processing.

FIG. 9 is a schematic view illustrating a first operation example of the indoor fan in the odor suppression processing. In FIG. 9, the horizontal axis represents time. The vertical axis represents an operation state of the air-conditioning apparatus 1 input from the remote 300, an operation state of the compressor 31, and a state of wind velocity of the indoor fan 37.

As shown in FIG. 9, when the remote 300 transmits a signal (ON signal) for starting operation of the air-conditioning apparatus 1 at $t_A$, operation of the compressor 31 is started at $t_B$. At this moment, the indoor fan 37 is in a stop state. That is, no air flow is coming from the indoor unit 100.

At $t_C$, which is a time when the first set time T1 has elapsed after the compressor 31 starts operating, operation of the indoor fan 37 is started. At this time, the indoor control device 50 controls the rotation rate of the indoor fan 37 so that the indoor fan 37 runs at less than a set minimum wind velocity (for example, "very low wind").

Next, at $t_D$, which is a time when the second set time T2 has elapsed from $t_C$, the indoor control device 50 controls the rotation rate of the indoor fan 37 so that the indoor fan 37 runs at the set minimum wind velocity (for example, "low wind"). Then, at $t_E$, which is a time when the third set time T3 has elapsed from to, the indoor control device 50 controls the rotation rate of the indoor fan 37 so that the indoor fan 37 runs at a set wind velocity (for example, "strong wind"). Note that, although the example of FIG. 9 shows a case where the third set time T3 is longer than the second set time T2, the set times are not limited thereto. The third set time T3 may be shorter than or equal to the second set time T2.

Figure 10:
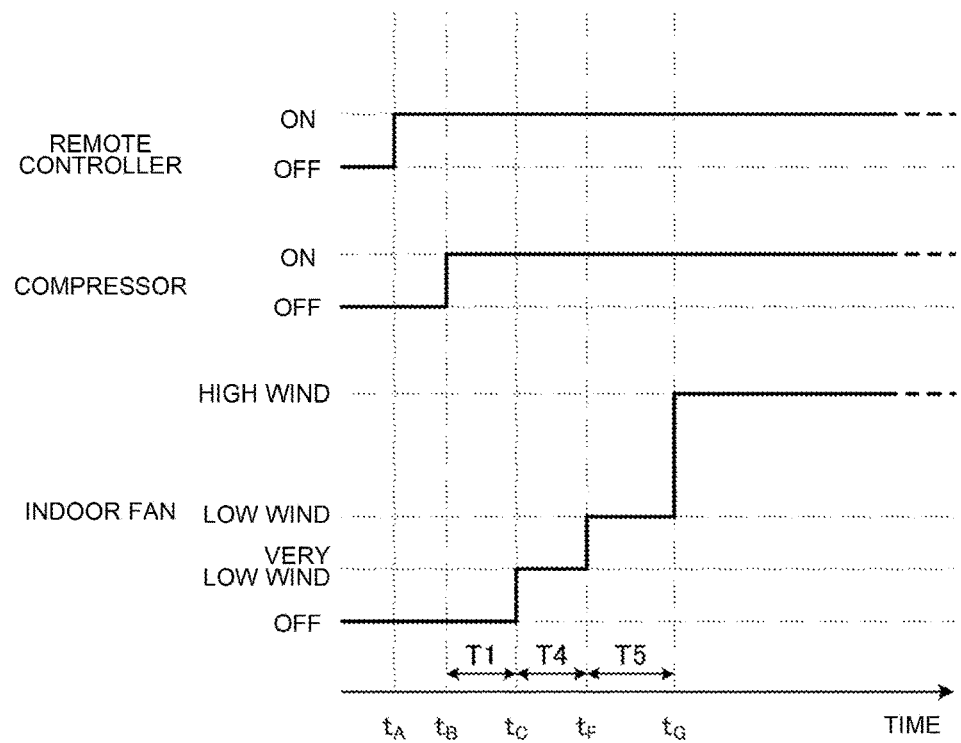
FIG. 10 is a schematic view illustrating a second operation example of the indoor fan in odor suppression processing.

FIG. 10 is a schematic view illustrating a second operation example of the indoor fan in the odor suppression processing. In FIG. 10, the horizontal axis represents time. The vertical axis represents an operation state of the air-conditioning apparatus 1 input from the remote 300, an operation state of the compressor 31, and a state of wind velocity of the indoor fan 37.

The second operation example shows a case where the wind velocity of the indoor fan 37 is increased to the set wind velocity in a shorter time than that of the first operation example, when it can be determined that the indoor heat exchanger 36 is wet. Whether or not the indoor heat exchanger 36 is wet can be determined by whether or not the temperature of the indoor heat exchanger 36 is below the dew-point temperature. Therefore, when a condition in which the temperature of the indoor heat exchanger 36 is kept below the dew-point temperature is known, the rotation rate of the indoor fan 37 is controlled according to the second operation example, and thus a time required for increasing the wind velocity of air blown from the indoor unit 100 to the set wind velocity can be shorten.

As shown in FIG. 10, when the remote 300 transmits a signal (ON signal) for starting operation of the air-conditioning apparatus 1 at $t_A$, the compressor 31 starts operating at $t_B$. At this moment, the indoor fan 37 is in a stop state. That is, no air flow is coming from the indoor unit 100.

At $t_C$, which is a time when the first set time T1 has elapsed after the compressor 31 starts operating, operation of the indoor fan 37 is started. At this time, the indoor control device 50 controls the rotation rate of the indoor fan 37 so that the indoor fan 37 runs at less than the set minimum wind velocity (for example, "very low wind").

Next, when the temperature of the indoor heat exchanger 36 is kept below the dew-point temperature from $t_C$ to $t_F$, which is a time when the fourth set time T4 has elapsed from $t_C$, the indoor control device 50 controls, at $t_F$, the rotation rate of the indoor fan 37 so that the indoor fan 37 runs at the set minimum wind velocity (for example, "low wind"). Then, when the temperature of the indoor heat exchanger 36 is kept below the dew-point temperature from $t_F$ to $t_G$, which a time when the fifth set time T5 has elapsed from $t_F$, the indoor control device 50 controls, at $t_G$, the rotation rate of the indoor fan 37 so that the indoor fan 37 runs at the set wind velocity (for example, "high wind"). Note that, although the example of FIG. 10 shows a case where the fifth set time T5 is longer than the fourth set time T4, the set times are not limited thereto. The fifth set time T5 may be shorter than or equal to the fourth set time T4.

(Odor Suppression Processing)

Figure 11:
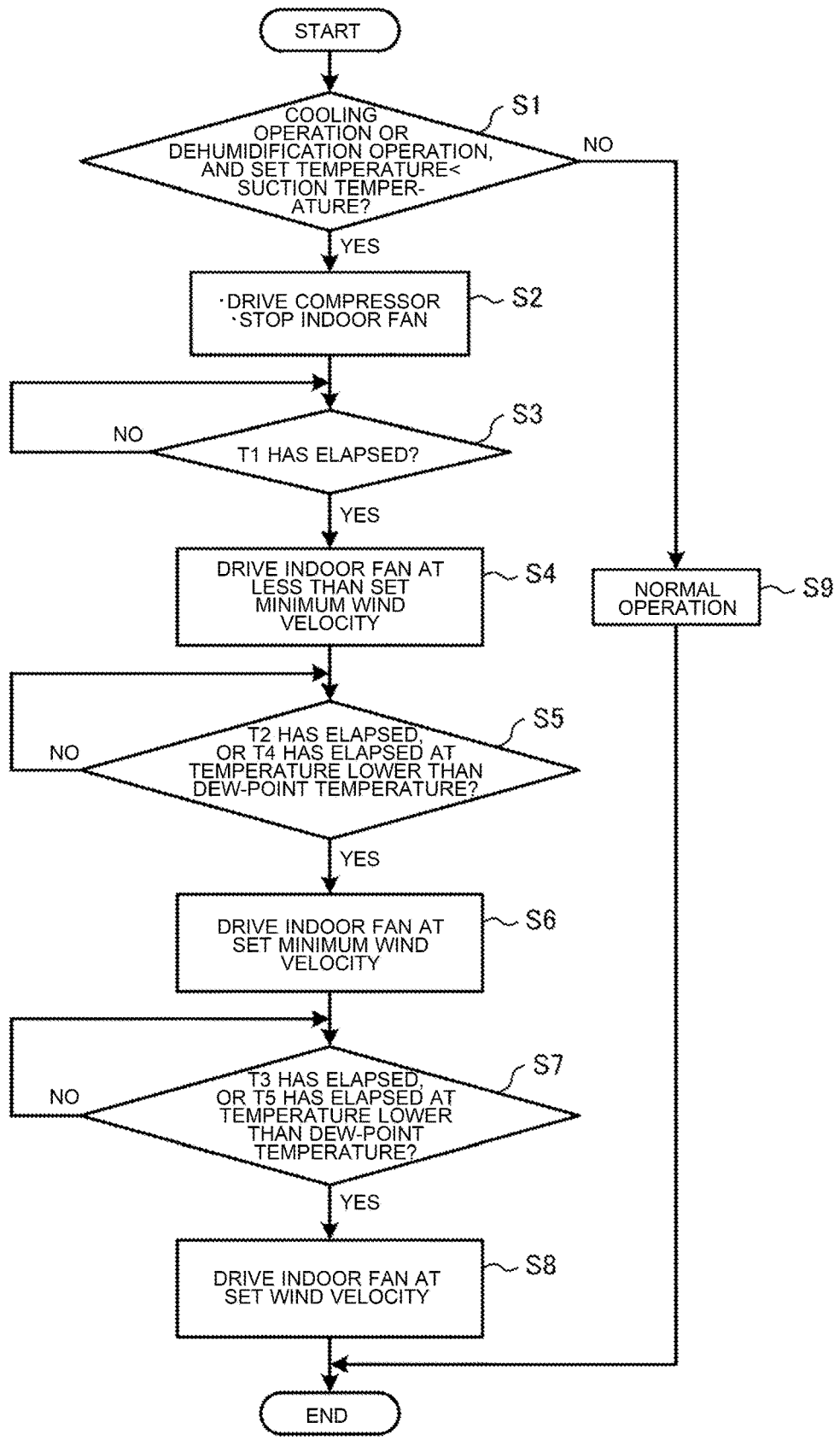
FIG. 11 is a flowchart illustrating an example of the flow of odor suppression processing in the air-conditioning apparatus according to Embodiment 1.

FIG. 11 is a flowchart illustrating an example of the flow of the odor suppression processing in the air-conditioning apparatus according to Embodiment 1. Note that, the following description is made of a case where the wind velocity of the air-conditioning apparatus 1 is set to "high" in advance by a user.

First, after an operation of the air-conditioning apparatus 1 is started by operating the remote 300 by a user, the comparison determination unit 52 of the indoor control device 50 determines whether or not the operation mode of the air-conditioning apparatus 1 is a cooling operation (or a dehumidification operation) and whether or not the set temperature is lower than the suction temperature in step S1.

The comparison between the set temperature and the suction temperature is made to determine whether or not the air-conditioning apparatus 1 enters a thermo-on state. When the set temperature is lower than the suction temperature, a cooling operation is started and the air-conditioning apparatus 1 enters a thermo-on state in which the compressor 31 is operating. Thus, the indoor heat exchanger 36 is cooled and thus gets wet. Meanwhile, when the set temperature is equal to or higher than the suction temperature, a cooling operation is not started and the air-conditioning apparatus 1 enters a thermo-off state in which the compressor 31 is stopped. Thus, the indoor heat exchanger 36 is not cooled. Because the control in the odor suppression processing is effective when the indoor heat exchanger 36 is cooled and gets wet, the comparison between the set temperature and the suction temperature is made to perform the odor suppression processing when the air-conditioning apparatus 1 enters the thermo-on state.

When it is determined that the operation mode of the air-conditioning apparatus 1 is a cooling operation or a dehumidification operation and the set temperature is lower than the suction temperature (YES in step S1), the device control unit 53 drives the compressor 31 in step S2. At this time, the device control unit 53 causes the indoor fan 37 to stop its operation when the indoor fan 37 is operating, or the device control unit 53 keeps the stop state of the indoor fan 37 when the indoor fan 37 is stopped.

In step S3, the comparison determination unit 52 compares a time measured by the timer 54 with the first set time T1, which has been stored in the storage unit 55 in advance. Then, the comparison determination unit 52 determines whether or not the first set time T1 has elapsed since the compressor 31 started operating.

When the first set time T1 has elapsed (YES in step S3), the device control unit 53 controls the rotation rate of the indoor fan 37 in step S4 so that the velocity of wind supplied to the indoor heat exchanger 36 becomes "very low", which is less than the set minimum wind velocity. Meanwhile, when the first set time T1 has not elapsed yet (NO in step S3), the processing returns to step S3 to repeat the processing of step S3 until the first set time T1 has elapsed since the compressor 31 started operating.

In step S5, the comparison determination unit 52 compares a time measured by the timer 54 with the second set time T2 or the fourth set time T4, which has been stored in the storage unit 55 in advance. Then, the comparison determination unit 52 determines whether or not the second set time T2 has elapsed since the indoor fan 37 started operating at "very low" whether or not the fourth set time T4 has elapsed since the indoor fan 37 started operating at "very low" in a state where the temperature of the indoor heat exchanger 36 is kept below the dew-point temperature.

When it is determined that the second set time T2 has elapsed since the indoor fan 37 started operating at "very low wind" or that the fourth set time T4 has elapsed since the indoor fan 37 started operating at "very low," in a state where the temperature of the indoor heat exchanger 36 is kept below the dew-point temperature (YES in step S5), the device control unit 53 controls the rotation rate of the indoor fan 37 in step S6 so that the velocity of wind supplied to the indoor heat exchanger 36 becomes "low", which is the set minimum wind velocity. Meanwhile, when the second set time T2 has not elapsed since the indoor fan 37 started operating at "very low" or the fourth set time T4 has not elapsed since the indoor fan 37 started operating at "very low" in a state where the temperature of the indoor heat exchanger 36 is kept below the dew-point temperature (NO in step S5), the processing returns to step S5.

Next, in step S7, the comparison determination unit 52 compares a time measured by the timer 54 with the third set time T3 or the fifth set time T5, which has been stored in the storage unit 55 in advance. Then, the comparison determination unit 52 determines whether or not the third set time T3 has elapsed since the indoor fan 37 started operating at "very low wind" or whether or not the fifth set time T5 has elapsed since the indoor fan 37 started operating at "low" in a state where the temperature of the indoor heat exchanger 36 is kept below the dew-point temperature.

When it is determined that the third set time T3 has elapsed since the indoor fan 37 started operating at "low wind" or that the fifth set time T5 has elapsed since the indoor fan 37 started operating at "low wind," in a state where the temperature of the indoor heat exchanger 36 is kept below the dew-point temperature (YES in step S7), the device control unit 53 controls the rotation rate of the indoor fan 37 in step S8 so that the velocity of wind supplied to the indoor heat exchanger 36 becomes a wind velocity set by a user (for example, "high"). Meanwhile, when the third set time T3 has not elapsed since the indoor fan 37 started operating at "low" or the fifth set time T5 has not elapsed since the indoor fan 37 started operating at "low wind," in a state where the temperature of the indoor heat exchanger 36 is kept below the dew-point temperature (NO in step S5), the processing returns to step S7.

Furthermore, in step S1, when the operation mode of the air-conditioning apparatus 1 is not a cooling operation or a dehumidification operation or when the set temperature is equal to or above the suction temperature (NO in step S1), the indoor control device 50 controls the air-conditioning apparatus 1 to perform a normal operation in step S9.

As described above, in the odor suppression processing, when operation of the air-conditioning apparatus 1 starts, operation of the indoor fan 37 is started after the first set time T1 has elapsed since the operation of the compressor 31 was started. Then, the rotation rate of the indoor fan 37 is gradually increased and thus the velocity of wind supplied to the indoor heat exchanger 36 is gradually increased. As a result, the indoor unit 100 is prevented from supplying air when the indoor heat exchanger 36 is getting wet immediately after the air-conditioning apparatus 1 starts operation. In addition, in the odor suppression processing, because, when the indoor fan 37 is driven, the rotation rate of the indoor fan 37 is controlled to be gradually increased, the wind velocity to the indoor heat exchanger 36 is not rapidly increased. Therefore, the indoor heat exchanger 36 in a wet state is not rapidly dried. Thus, the air-conditioning apparatus 1 according to Embodiment 1 can suppress generation of an unusual odor by performing the odor suppression processing at the start of operation.

Note that, in this example, determination is made whether or not the temperature of the indoor heat exchanger 36 is below the dew-point temperature based on the temperature detected by the two-phase pipe temperature sensor 43, but the determination is not limited thereto. The determination may be performed based on the temperature detected by the liquid pipe temperature sensor 44. Although the liquid pipe temperature sensor 44 detects the temperature of the refrigerant entering the indoor heat exchanger 36 in a cooling operation, the temperature of the liquid pipe on the inlet side of the indoor heat exchanger 36 is often lower than the temperature of the two-phase pipe in the indoor heat exchanger 36 in cooling operation. Therefore, in normal cases, it is only required to confirm that the temperature of the two-phase pipe is below the dew-point temperature. However, when the temperature of the indoor heat exchanger 36 is determined to be below the dew-point temperature by confirming that the temperature of the two-phase pipe or that of the liquid pipe, whichever is higher, is below the dew-point temperature for just in case, a condition where the temperature of the indoor heat exchanger 36 is below the dew-point temperature can be reliably detected.

As described above, in the air-conditioning apparatus 1 according to Embodiment 1, the indoor control device 50 runs the indoor fan 37 to gradually increase the wind velocity after the first set time T1 has elapsed since the compressor 31 started operating at the start of a cooling operation.

In this case, the indoor control device 50 runs the indoor fan 37 at less than the set minimum wind velocity after the first set time T1 has elapsed since the compressor 31 started operating. Furthermore, the indoor control device 50 runs the indoor fan 37 at the set minimum wind velocity after the second set time T2 has elapsed since the indoor fan 37 started operating at less than the set minimum wind velocity or after the third set time T3 has elapsed since the indoor fan 37 started operating at less than the set minimum wind velocity, in a state where the temperature of the indoor heat exchanger 36 is kept below the dew-point temperature. Then, the indoor control device 50 runs the indoor fan 37 at the set wind velocity after the second set time T2 has elapsed since the indoor fan 37 started operating at the set minimum wind velocity or after the third set time T3 has elapsed since the indoor fan 37 started operating at the set minimum wind velocity, in a state where the temperature of the indoor heat exchanger 36 is kept below the dew-point temperature.

As described above, the indoor fan 37 is driven while the temperature of the indoor heat exchanger 36 is kept at a low temperature and dew is formed on the indoor heat exchanger 36 by gradually increasing the wind velocity of the indoor fan 37. As a result, generation of an unusual odor from the indoor heat exchanger 36 at the start of a cooling operation can be suppressed.

Furthermore, in the air-conditioning apparatus 1, because the wind velocity of the indoor fan 37 is gradually increased after the start of a cooling operation, the indoor heat exchanger 36 in a wet state is not rapidly dried. As a result, an unusual odor that may be generated when the indoor heat exchanger is getting dry can be prevented.

In the air-conditioning apparatus 1, the dew-point temperature is derived based on the indoor temperature and the indoor humidity. By using these values, the indoor control device 50 can determine whether or not dew is formed on the indoor heat exchanger 36, and thus can determine whether or not the indoor heat exchanger 36 is wet.

Embodiment 2

Next, Embodiment 2 will be described. Embodiment 2 differs from Embodiment 1 in that no humidity sensor 42 is provided in Embodiment 2. Note that, in Embodiment 2, components that are common to those in Embodiment 1 will be denoted by the same reference signs, and their detailed descriptions will be omitted.

As described in Embodiment 1, in the odor suppression processing, the dew-point temperature can be used when the wind velocity of the indoor fan 37 is gradually increased. In general, the dew-point temperature of the indoor air is calculated based on the temperature and the humidity of the air. For this reason, when the humidity of the indoor air cannot be detected, the dew-point temperature of the indoor air cannot be obtained. Therefore, in Embodiment 2, when the odor suppression processing is performed by using a dew-point temperature, a fictive dew-point temperature corresponding to the dew-point temperature of the indoor air is used.

Generally, a cooling operation of the air-conditioning apparatus 1 is performed under a usage environment expected by the manufacturer. Therefore, when a temperature equivalent to the dew-point temperature is set as a fictive dew-point temperature in the expected usage environment, processing similar to the odor suppression processing using the dew-point temperature can be performed.

Meanwhile, it is known that, under the same humidity environments, the higher the temperature of air is, the higher the dew-point temperature becomes. Furthermore, the dew-point temperature is lower than the temperature of air. Hence, when a calculated value obtained by subtracting a set temperature from the air temperature is used as a fictive dew-point temperature, dew formation on the indoor heat exchanger 36 can be reliably determined if the fictive dew-point temperature is lower than the actual dew-point temperature.

For instance, a case is considered where the expected usage environment of the air-conditioning apparatus 1 is an environment in which, for example "the indoor humidity is 40% relative humidity (RH) and the indoor temperature is from 19 to 30 degrees C.". FIG. 12 is a schematic view illustrating a relationship between dew-point temperature and fictive dew-point temperature in Embodiment 2.

As shown in FIG. 12, supposing that the humidity of air to be sucked into the indoor unit 100 is 40% RH and a usage temperature range of the air-conditioning apparatus 1 is from 19 to 30 degrees C., the dew point temperature is about 5.1 degrees C. when the temperature of the air is 19 degrees C., which is the lowest temperature in the usage temperature range. In addition, the dew point temperature is about 14.9 degrees C. when the temperature of the air is 30 degrees C., which is the highest temperature in the usage temperature range. Meanwhile, when a set value to be subtracted from the suction temperature, which is the indoor air temperature, is set to 16 degrees C., the fictive dew-point temperature for a case where the suction temperature is 19 degrees C. is 3 degrees C. The fictive dew-point temperature for a case where the suction temperature is 30 degrees C. is 14 degrees C.

Thus, in this example, by setting the set value to be subtracted from the air temperature to 16 degrees C., the fictive dew-point temperature becomes lower than the dew-point temperature in the usage temperature range. Therefore, when the fictive dew-point temperature obtained in this way is used in the odor suppression processing, dew formation on the indoor heat exchanger 36 can be reliably determined.

Note that, when the odor suppression processing is performed by using a fictive dew-point temperature, calculation for deriving the fictive dew-point temperature by subtracting the set value from the suction temperature, which is the air temperature, is performed by the arithmetic unit 51 in the indoor control device 50. In addition, the set value to be subtracted from the suction temperature, used in the calculation in the arithmetic unit 51 is stored in the storage unit 55 in advance. As the set value for this case, a user selects an appropriate value in advance while taking the expected usage temperature range into consideration.

As described above, in the air-conditioning apparatus 1 according to Embodiment 2, the fictive dew-point temperature obtained by subtracting the set value from the indoor temperature is used in place of the actual dew-point temperature. As a result, as with the case of Embodiment 1, the indoor control device 50 can determine whether or not dew is formed on the indoor heat exchanger 36, and thus can determine whether or not the indoor heat exchanger 36 is wet.

The invention claimed is:

1. An air-conditioning apparatus having a refrigerant circuit, in which a compressor, an outdoor heat exchanger, an expansion device, and an indoor heat exchanger are connected by a pipe and refrigerant circulates in the pipe, comprising:
   an indoor fan configured to supply an indoor air to the indoor heat exchanger; and
   a controller configured to control the compressor and the indoor fan, the controller being configured to
      run the compressor at a start of a cooling operation,
      start running the indoor fan at less than a set minimum wind velocity after a first set time has elapsed since the compressor started operating, wherein the set minimum wind velocity represents a lowest wind velocity settable by a user within an operable range of the indoor fan,
      run the indoor fan at the set minimum wind velocity after a second set time has elapsed since the indoor fan started operating at less than the set minimum wind velocity, and
      run the indoor fan at a set wind velocity greater than the set minimum wind velocity after a third set time has elapsed since the indoor fan started operating at the set minimum wind velocity, wherein the set wind velocity is settable in advance by the user.

2. The air-conditioning apparatus of claim 1,
   wherein the controller is configured to
   run the indoor fan at the set minimum wind velocity after a fourth set time, which is shorter than the second set time, has elapsed since the indoor fan started operating at less than the set minimum wind velocity, in a state where a temperature of the indoor heat exchanger is below a dew-point temperature, and
   run the indoor fan at the set wind velocity after a fifth set time has elapsed since the indoor fan started operating at the set minimum wind velocity, in a state where the temperature of the indoor heat exchanger is below the dew-point temperature.

3. The air-conditioning apparatus of claim 2, further comprising:
   a suction temperature sensor configured to detect an indoor temperature, which is a temperature of the indoor air; and
   a humidity sensor configured to detect an indoor humidity, which is a humidity of the indoor air,
   wherein the controller is configured to derive the dew-point temperature based on the indoor temperature and the indoor humidity.

4. The air-conditioning apparatus of claim 2, further comprising:
   a suction temperature sensor configured to detect an indoor temperature, which is a temperature of the indoor air,
   wherein the controller is configured to calculate a fictive dew-point temperature by subtracting a set value from the indoor temperature, and use the calculated fictive dew-point temperature in place of the dew-point temperature.

* * * * *